United States Patent
Wilson et al.

(10) Patent No.: US 9,060,141 B2
(45) Date of Patent: Jun. 16, 2015

(54) IR DETECTOR SYSTEM AND METHOD

(75) Inventors: Mark Clifford Wilson, Nutcher's Drove (GB); Peter Michael Thorne, Romsey (GB)

(73) Assignee: SELEX ES LTD, Essex (GB)

( * ) Notice: Subject to any disclaimer, the term of this patent is extended or adjusted under 35 U.S.C. 154(b) by 435 days.

(21) Appl. No.: 13/393,765

(22) PCT Filed: Aug. 31, 2010

(86) PCT No.: PCT/EP2010/062759
§ 371 (c)(1),
(2), (4) Date: Mar. 1, 2012

(87) PCT Pub. No.: WO2011/036041
PCT Pub. Date: Mar. 31, 2011

(65) Prior Publication Data
US 2012/0154597 A1 Jun. 21, 2012

(30) Foreign Application Priority Data

Sep. 24, 2009 (GB) .................................. 0916815.4

(51) Int. Cl.
*H04N 5/33* (2006.01)
*H04N 5/355* (2011.01)
*H04N 3/14* (2006.01)
*H04N 5/3745* (2011.01)

(52) U.S. Cl.
CPC ............. *H04N 5/3559* (2013.01); *H04N 3/155* (2013.01); *H04N 5/33* (2013.01); *H04N 5/3745* (2013.01); *H04N 5/37452* (2013.01)

(58) Field of Classification Search
USPC ........................................................ 348/164
See application file for complete search history.

(56) References Cited

U.S. PATENT DOCUMENTS

| | | | | |
|---|---|---|---|---|
| 5,512,750 | A | * | 4/1996 | Yanka et al. ................ 250/338.4 |
| 5,546,127 | A | * | 8/1996 | Yamashita et al. ............ 348/297 |
| 5,757,008 | A | * | 5/1998 | Akagawa et al. ........ 250/370.08 |
| 5,986,510 | A | | 11/1999 | Graeve et al. |
| 5,990,506 | A | * | 11/1999 | Fossum et al. ................ 257/294 |
| 2003/0107658 | A1 | * | 6/2003 | Huang et al. ............... 348/221.1 |
| 2004/0095492 | A1 | | 5/2004 | Baxter et al. |
| 2006/0170804 | A1 | | 8/2006 | Kwon |

(Continued)

FOREIGN PATENT DOCUMENTS

| | | |
|---|---|---|
| JP | 2003-009003 A | 1/2003 |
| JP | 2004-087898 A | 3/2004 |

(Continued)

OTHER PUBLICATIONS

International Search Report (PCT/ISA/210) issued on Feb. 16, 2011, by European Patent Office as the International Searching Authority for International Application No. PCT/EP2010/062759.
United Kingdom Search Report for GB 0916815.4 dated Jan. 14, 2010.

*Primary Examiner* — Tracy Li
(74) *Attorney, Agent, or Firm* — Buchanan Ingersoll & Rooney PC

(57) ABSTRACT

A system and method of reducing undesirable image artifacts such as image tear and image smearing are described. The system can include a series of pixels and enhanced sensitivity circuits. The circuit can be configured so as to operate in an enhanced sensitivity mode having a combination of sample and hold circuits and binning functions, the combination acting so as to reduce the undesirable imaging artifacts.

14 Claims, 2 Drawing Sheets

Typical frame readout sequence and timing (in ms) for a full TV format array (640 x 512, 4 outputs); a) top - ITR; b) middle – ITR binning; c) bottom – Enhanced binning in accordance with one form of the invention. Note that controls applied to configure each operation are omitted for clarity

(56) References Cited

U.S. PATENT DOCUMENTS

2008/0231727 A1 9/2008 Compton et al.
2009/0152664 A1* 6/2009 Klem et al. .................. 257/440
2009/0295453 A1 12/2009 Nishino et al.
2010/0277633 A1* 11/2010 Boemler ...................... 348/308

FOREIGN PATENT DOCUMENTS

| WO | WO 99/35821 A1 | 7/1999 |
| WO | WO 2008/096434 A1 | 8/2008 |
| WO | WO 2008/115500 A2 | 9/2008 |

* cited by examiner

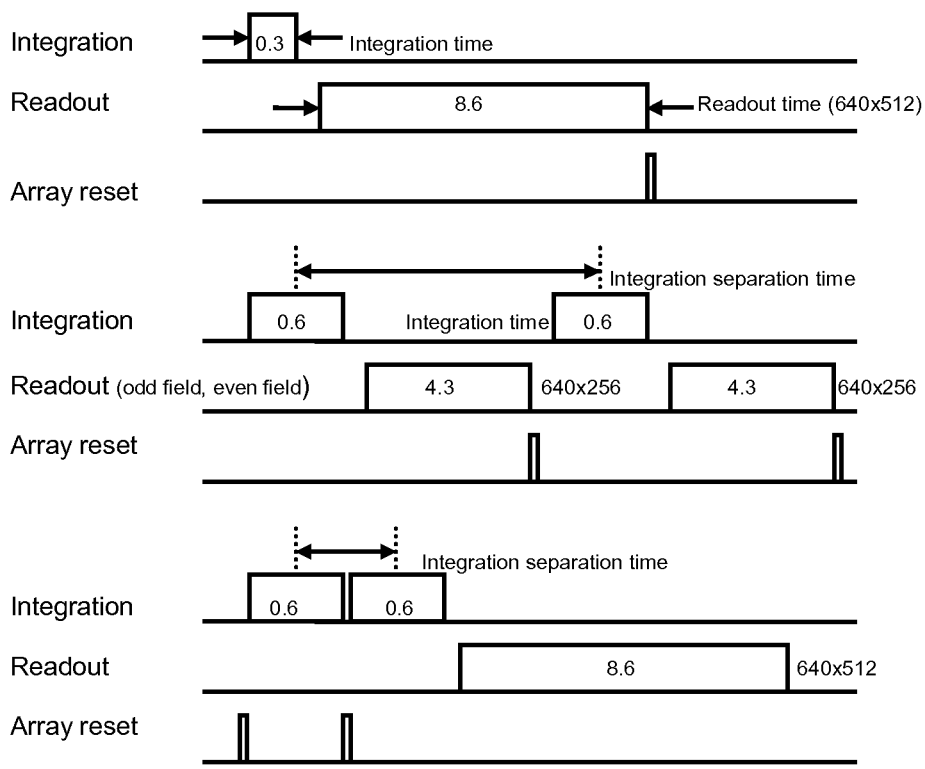
Figure 1  Typical frame readout sequence and timing (in ms) for a full TV format array (640 x 512, 4 outputs); a) top - ITR; b) middle – ITR binning;  c) bottom – Enhanced binning in accordance with one form of the invention. Note that controls applied to configure each operation are omitted for clarity

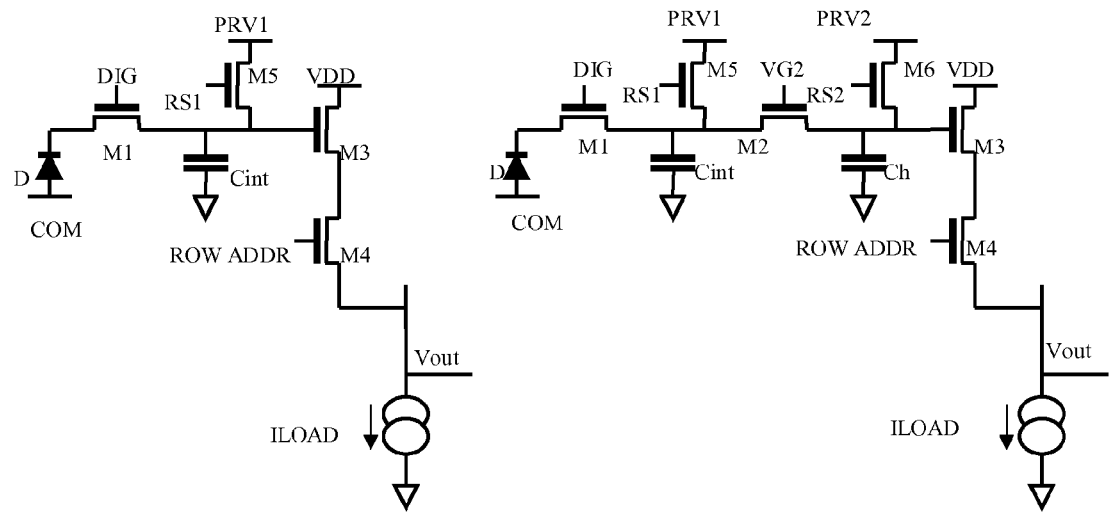
Figure 2 Example prior art pixel circuits (a) DIG circuit, and (b) DIG with IWR function
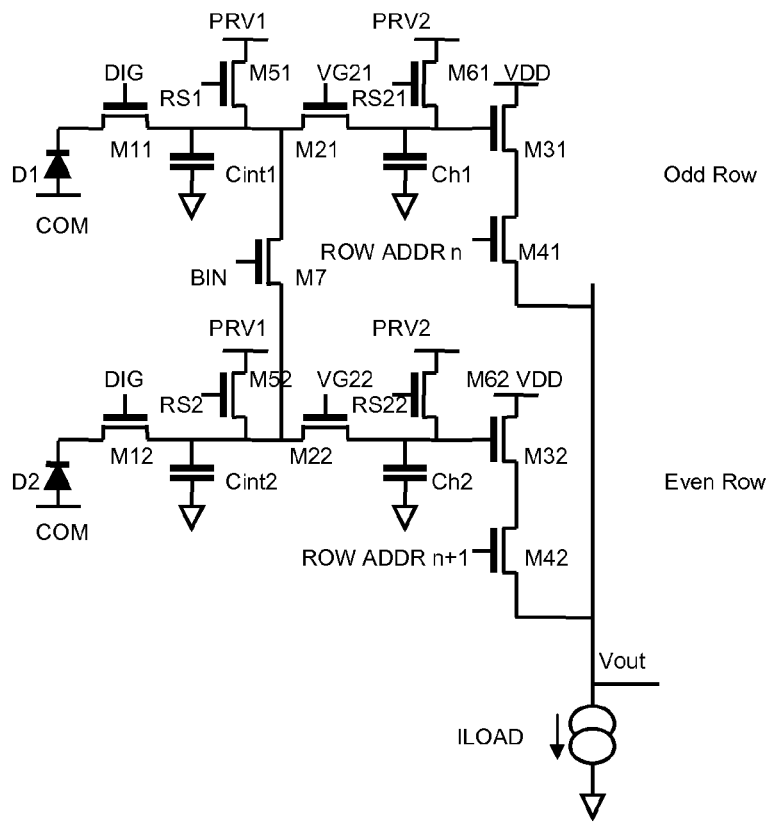
Figure 3 Pixel circuits showing 2-way binning connection between odd and even row.

IR DETECTOR SYSTEM AND METHOD

The invention relates to an Infra Red (IR) detector system and method. More specifically, but not exclusively, it relates to a system and method that changes the configuration of elements within the pixel to reduce the time delay between stare times for successive fields of data, reducing image tear and smear when operating in enhanced sensitivity or binning mode.

The performance of conventional infrared staring array detectors can be enhanced by using the widely known technique of pixel binning. Pixel integration capacitors are shared or binned in a group and are then connected in turn to each photodiode detector element in the group to increase the integrated signal charge storage capacity and therefore improve thermal sensitivity. Thermal sensitivity increases by a factor $\sqrt{n}$ where n is the number of binned pixels in the group and can be seen to be advantageous. A field of image data is acquired and read out for each element that when taken together allows a full image to be composed.

In operation, the integration time increases by factor n which increases the frame period. More significantly, the separation in time between fields of image data by the field readout time leads to undesirable imaging artefacts such as multiple images for moving targets and image blur that degrades image quality and limits performance for such an enhanced sensitivity mode in the sensor. Integration and readout operation for conventional Integrate then Read (ITR) and Binning modes are illustrated in FIGS. 1(a) and 1(b).

In some cases, usually, but not exclusively, in Medium Waveband Infrared (MWIR) applications, the integration capacitor may be split into a number of smaller capacitor elements with connecting gates to accommodate a range of signal conditions or for low flux applications.

In other cases, a sample and hold (s/h) circuit is used of a form shown in FIG. 2b. It uses a pass transistor (M2), reset transistor (M6) and hold capacitor (Ch) to allow the pixel circuit to operate in so called Integrate While Read (IWR). The signal is copied onto Ch that has been previously reset by operating the pass transistor M2. When used, this allows photodiode signal integration to be accomplished in parallel with the read operation to enable longer integration times to be achieved within the frame period.

In yet other cases, usually, but not exclusively in Long Waveband Infrared (LWIR) applications having large flux, the best sensitivity can be achieved using the largest possible integration capacitor. Therefore LWIR sensors are less likely to use split integration capacitor designs. Since the stare time may be very short for a LWIR sensor, the sensitivity can be enhanced by sharing integration capacitors between pixels. This can be achieved using the binning technique by sharing the integration capacitors for example, between pixels from adjacent odd and even rows by using a transistor pass gate between the capacitors to choose whether or not to share, i.e. switch between conventional and binning modes of operation. Other binning configurations using neighbouring column pixels or other pixel group formations are equally possible. Sample and hold capacitors are not normally required or used for LWIR operation because integration times are generally short enough that when added to the readout time, are still less than the frame period. In fact, providing a s/h capacitor detracts from the maximum possible integration capacitance in a pixel design and is usually avoided.

In MWIR sensors the opposite problem can occur, where the flux is sufficiently low that in order to make full use of the available capacitance the stare time is longer than the frame time less the time required to read out the data from the array. In this case a sample and hold capacitor is added to allow integration to occur whilst the sensor is simultaneously reading out the data from the previous image frame. This approach has the disadvantage that the s/h capacitor detracts from the integration capacitance in the pixel and compromises the ultimately achievable sensitivity.

According to the invention there is provided an infrared detector system comprising a series of pixels and further comprising enhanced sensitivity circuit means, said circuit means being configured so as to operate in an enhanced sensitivity mode comprising a combination of independently operable sample and hold circuit means and binning function means, said combination acting so as to reduce undesirable imaging artefacts.

According to the invention there is further provided a method of reducing undesirable imaging artefacts in IR detector systems comprising the steps of:
 a) binning together pixels in pixel groups by asserting respective binning control(s) of said pixels
 b) Configuring said pixel group so the first pixel in a group sample and hold circuit is turned on (opened) such that when operated will integrate a signal into a combined integration capacitance on a first sample and hold capacitor, and will not integrate into the other pixels in the groups' sample and hold capacitor(s)
 c) Operating the first pixel in the group so as to reset the combined integration capacitance
 d) Operating the first pixel in the group such that a signal is acquired onto the combined integration capacitance
 e) Turning off (closing) the sample and hold circuit for the first pixel in the group
 f) Configuring the pixel group so the second pixel in the group sample and hold circuit is turned on (opened) such that when operated will integrate a signal into the combined integration capacitance on a second sample and hold capacitor, and will not integrate into the other pixels in the groups' sample and hold capacitor(s)
 g) Retaining the signal for the first pixel in the group on said first sample and hold capacitor.
 h) Repeating steps (c) to (g) for the second and all other pixels in the group such that the time between collecting the signal information for each pixel in the group is minimised thereby reducing the effects of undesirable imaging artefacts on an output image.

In this manner, an Enhanced Binning mode is proposed that combines existing circuit elements with a new configuration and operational technique to minimise the temporal separation between fields to reduce the effects of such undesirable imaging artefacts, to improve the use of enhanced sensitivity mode operation and so improve performance in this mode. In this way it changes the configuration of elements within the pixel to reduce the time delay between stare times for successive fields of data, reducing image tear and smear.

The invention will now be described with reference to the accompanying diagrammatic drawings in which:

FIG. 1 is a schematic drawing showing the frame readout sequence and timing (in ms) for a full TV format array (640× 512, 4 outputs); a) top—ITR; b) middle—ITR binning; c) bottom—Enhanced binning, in accordance with one form of the invention. Note that controls applied to configure each operation are omitted for clarity;

FIG. 2 is a schematic drawing showing example prior art pixel circuits (a) Direct Inject Gate (DIG) circuit, and (b) DIG circuit with IWR function; and FIG. 3 is a schematic drawing showing pixel circuits having a 2-way binning connection between odd and even rows.

In one embodiment of the invention, a 2-way binning case is shown in FIG. 3 and is used to explain the enhanced binning operation in general terms. In this example, integration capacitors in adjacent odd and even rows are binned (n=2).

The Read Out Integrated Circuit (ROIC) is configured for operation in binning mode by asserting BIN to turn transistor M7 on. Integration capacitor Cint1 is therefore electrically connected to integration capacitor Cint2. In this embodiment and for discussion purposes, Cint12=Cint1+Cint2. It will be appreciated that these capacitance terms include any contribution from parasitic terms present on the respective nets.

The pixel array is configured to acquire image signal data from the array's odd rows. VG21 is asserted to turn on the sample and hold transistor M21 to connect the odd pixel s/h capacitor Ch1 to the conjoined integration capacitance Cint. VG22 is retracted to turn off the transistor M22 to isolate the even pixel s/h capacitor Ch2. The combined integration capacitance is Cint=Cint12+Ch1=Cint1+Cint2+Ch1 which is reset using any of the reset transistors M51, M52, M61 by asserting RS1, RS2 or RS21 respectively.

The integration period is started for the odd rows by biasing the DIG transistor M11. During the integration period the signal is integrated onto the total combined integration capacitance Cint. After the conclusion of the odd row integration period, VG21 is retracted to turn the s/h transistor M21 off and the odd pixel signal voltage remains sampled on the s/h capacitor Ch1.

The pixel array is then configured to acquire image signal data from the array's even rows.

VG22 is asserted to turn on the sample and hold transistor M22 to connect the even pixel s/h capacitor Ch2 to the conjoined integration capacitance Cint. VG21 remains retracted to ensure transistor M21 remains off to isolate the signal on the odd pixel s/h capacitor Ch1. The combined integration capacitance is Cint=Cint12+Ch2=Cint1+Cint2+Ch2 which is reset using any of the reset transistors M52, M51, M62 by asserting RS2, RS1 or RS22 respectively.

The integration period is started for the even rows by biasing the DIG transistor M12. During the integration period the signal is integrated onto the total combined integration capacitance Cint. After the conclusion of the even row integration period, VG22 is retracted to turn the s/h transistor M22 off and the even pixel signal voltage remains sampled on the s/h capacitor Ch2.

This approach offers advantages over the conventional approach to operation in binning mode. Most significantly, the image field capture periods are separated only by the stare time for the first (odd rows) field and the reset period required for the second (even rows) field. For comparison see FIG. 1(b) and FIG. 1(c). In practice, a long waveband detector operating in enhanced binning mode, could be expected to have an integration separation time of around 0.65 ms (0.6 ms integration time and 0.05 ms, say, reset time). Comparing this to operation in conventional binning mode, the integration separation time is dominated by the readout time which is expected to be around 4.9 ms for a full TV (640×512) array, say, with 4 outputs being clocked at 10 MHz and considerably more at slower clock speeds. Operating in enhanced binning mode is therefore expected to reduce the impact of image artefacts such as image smear or multiple images of fast moving targets by a factor proportional to the reduction in integration separation time of $4.9/0.65 \cong 7.5$.

It will be appreciated that the sample and hold circuit is shown in its simplest form. In this form, the transistor gate terminal control signals (i.e. V21 and V22 in the case of a 2 way binning pixel group (n=2)) may be implemented using alternative configurations such as two transistors in series. This approach is increasingly advantageous for larger pixel groups allowing a control matrix track structure to be implemented more easily than by separate controls to each pixel in the group. The novelty of the invention is unaffected by the realisation of the sample and hold circuit implementation.

It will be appreciated that another advantage of operation in enhanced binning mode is that the readout sequence becomes identical to normal ITR or blinking mode.

It will also be appreciated, that operation in non binning mode is made possible by retaining all appropriate circuit elements. In this configuration, BIN is retracted turning M7 off. VG21 and VG22 are asserted turning s/h transistors M21 and M22 on respectively connecting s/h capacitors Ch1 and Ch2 to their respective integration capacitors Cint1 and Cint2 thereby maximising the integration capacitance and thermal sensitivity for LWIR use for example.

It will also be appreciated that this technique is valid for all other pixel circuit designs using a binning function and is not limited in any way to the Direct Inject circuit form used herein to describe this innovation.

It will also be appreciated that whereas this technique has been explained in detail for the case of 2 way binning (n=2), the technique is equally applicable to other binning configurations or solutions.

In practice, the imaging artefacts associated with conventional binning limit the amount of binning that can be used. This technique described in one form of the invention enables the user to increase the amount of binning with associated improvement in sensitivity and reduction in unwanted imaging artefacts.

The invention claimed is:

1. An infrared detector system, comprising:
   a series of pixels in a staring array having associated circuits, wherein the staring array is divided into a series of pixel groups, each pixel group having an integration capacitance; and
   enhanced sensitivity circuit means configured so as to operate in an enhanced sensitivity mode, wherein when image signal data is acquired, a hold capacitance of a first pixel group is electrically connected to a combined integration capacitance of the first pixel group and an adjacent second pixel group, and during integration periods, the hold capacitance of each of pixel group is configured to store a pixel signal voltage of the associated pixel group based on an integration of image signal data stored in the combined integration capacitance.

2. An IR detector system according to claim 1, comprising:
   a means configured to allow operation in standard sensitivity or enhanced binning modes to suit operational or imaging conditions.

3. An IR detector system according to claim 1, in which the imaging artefacts include, but not be limited to, at least image tear and image smearing.

4. An IR detector system according to claim 1, in which the system comprises:
   means for increasing an amount of binning to decrease a likelihood of imaging artefacts and increase sensitivity.

5. An IR detector system according to claim 1, wherein the enhanced sensitivity circuit means is configured for establishing a length of separation between image capture periods of the staring array equal to a reset period of the staring array.

6. An IR detector system according to claim 5, wherein the reset period of the staring array is a reset period for an image capture field of the staring array.

7. An IR detector system according to claim 6, wherein the image capture field is one of a plurality of image capture fields.

8. An infrared detector system according to claim 1, wherein the enhanced sensitivity circuit includes a combination of an independently operable sample and hold circuit, a hold capacitor reset circuit, binning function means, and operational sequence means, said combination being configured for reducing undesirable imaging artifacts.

9. An infrared detector system according to claim 8, in which the sample and hold circuit comprises:
   control function means implemented and operated separately in each pixel group to provide enhanced binning.

10. An IR detector system according to claim 8, in which the binning function means is configured for operation independently with the sample and hold circuit of each pixel group.

11. An IR detector system according to claim 8, in which the system comprises:
   means to maximise integration capacitance in each pixel group.

12. An IR detector system according to claim 8, wherein the circuit means is configured for providing separate field readout requirements in a single readout frame.

13. An IR detector system according to claim 12, comprising:
   means to minimise time between the integration time of each pixel group.

14. An IR detector system according to claim 8 wherein the circuit means is configured to allow the pixel circuits to operate in non enhanced sensitivity mode.

* * * * *